United States Patent [19]

Wu

[11] Patent Number: 5,033,369

[45] Date of Patent: Jul. 23, 1991

[54] APPARATUS AND METHOD FOR PREPARING DEEP FRIED FOOD PORTIONS

[76] Inventor: Axuan N. Wu, 1862 E. Gate Dr., Stone Mountain, Ga. 30087

[21] Appl. No.: 407,125

[22] Filed: Sep. 14, 1989

[51] Int. Cl.⁵ .............................................. A47J 37/12
[52] U.S. Cl. ...................................... 99/408; 99/415; 99/410; 99/439; 210/167
[58] Field of Search ................. 99/403, 408, 336, 359, 99/415, 414, 413, 418, 410; 134/135; 210/153, 167, 171

[56] References Cited

U.S. PATENT DOCUMENTS

| | | |
|---|---|---|
| 1,396,416 | 11/1921 | Garrett . |
| 1,579,874 | 4/1926 | Locke . |
| 1,625,999 | 4/1927 | Irish . |
| 2,397,410 | 3/1946 | Deacon ................................ 99/403 |
| 2,635,527 | 4/1953 | Overbeck . |
| 2,772,978 | 12/1956 | Shaw ................................ 99/403 X |
| 3,430,553 | 3/1969 | DePietro . |
| 3,869,972 | 3/1975 | Chase . |
| 3,933,645 | 1/1976 | Keramides . |
| 3,937,136 | 2/1976 | Cox ...................................... 99/408 |
| 3,943,838 | 3/1976 | Price ..................................... 99/403 |
| 3,975,997 | 8/1976 | DiPietro . |

*Primary Examiner*—Frankie L. Stinson
*Attorney, Agent, or Firm*—Jones, Askew & Lundsford

[57] ABSTRACT

An apparatus and method for preparing deep fried food portions. The apparatus consists of a floor and at least one side wall extending upwardly from the floor. The floor contains one screen-covered drain, two pinhole-sized drainage holes, and a plurality of substantially planar floor portions. The selected size of the holes in the screen covering the drain depends upon the size of particles which naturally detach from food portions during preparation. The apparatus is placed in a cooking liquid-filled conventional deep fryer, and cooking liquid enters the apparatus through the drain, drain holes, and openings in the side walls, partially filling the apparatus. Food portions are coated with either a batter or breading and are placed in the apparatus. The food portions immediately sink to the bottom of the apparatus, directly contacting the floor portions. Unlike typical mesh food baskets, the coating does not "grip" the floor portions. Upon initial hardening of the coating, the food portions, intact except for loss of particles which naturally detach during preparation, float to the surface of the cooking liquid within the apparatus. Upon completion of the cooking of the food portions, any particles which have accumulated in the cooking liquid are easily removed.

13 Claims, 2 Drawing Sheets

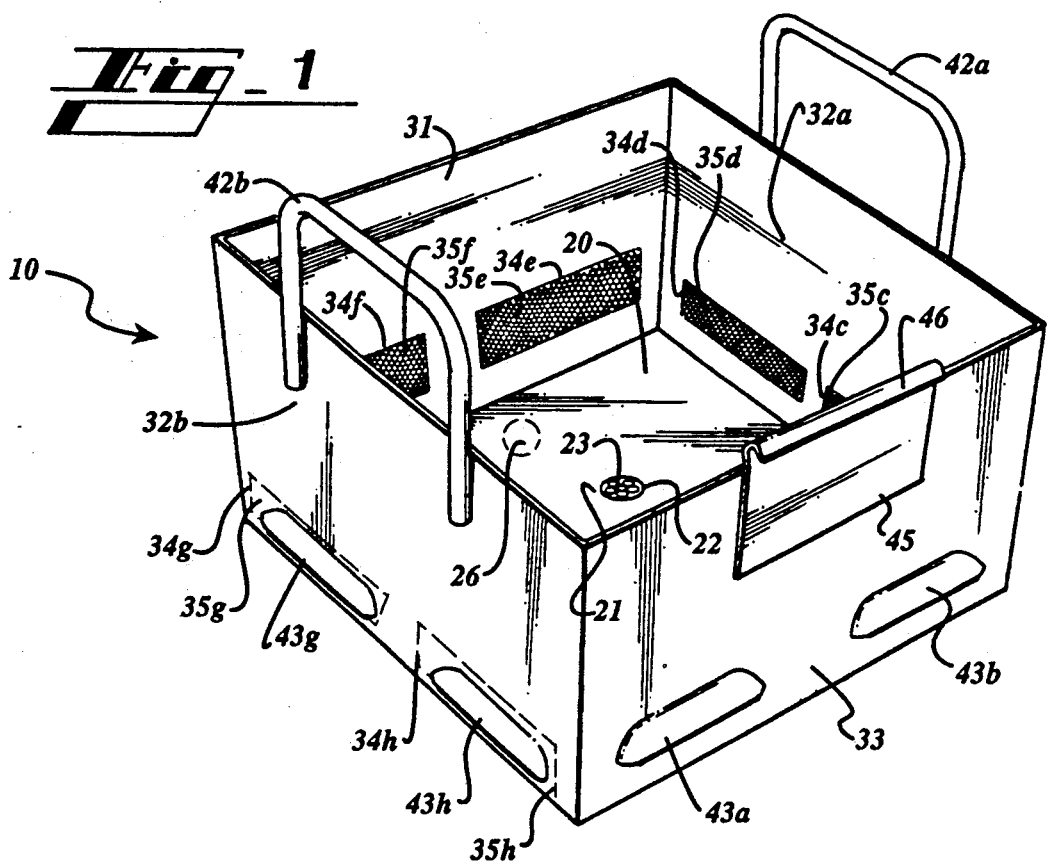
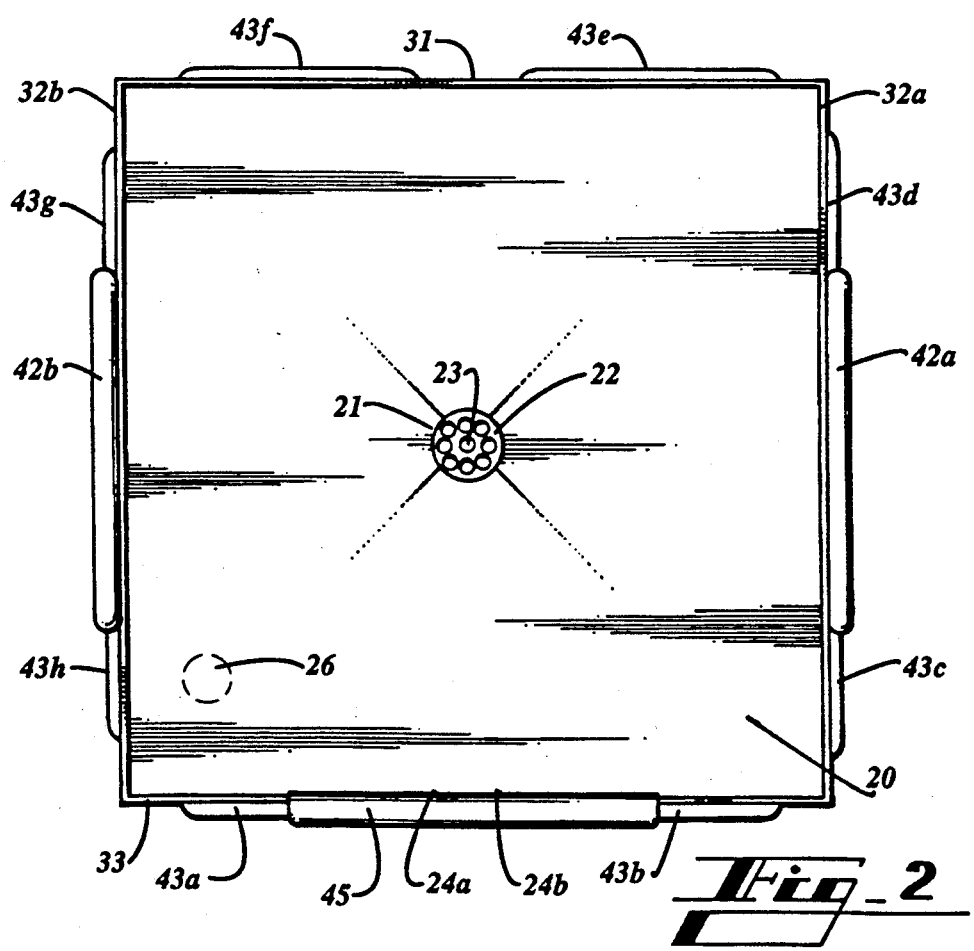

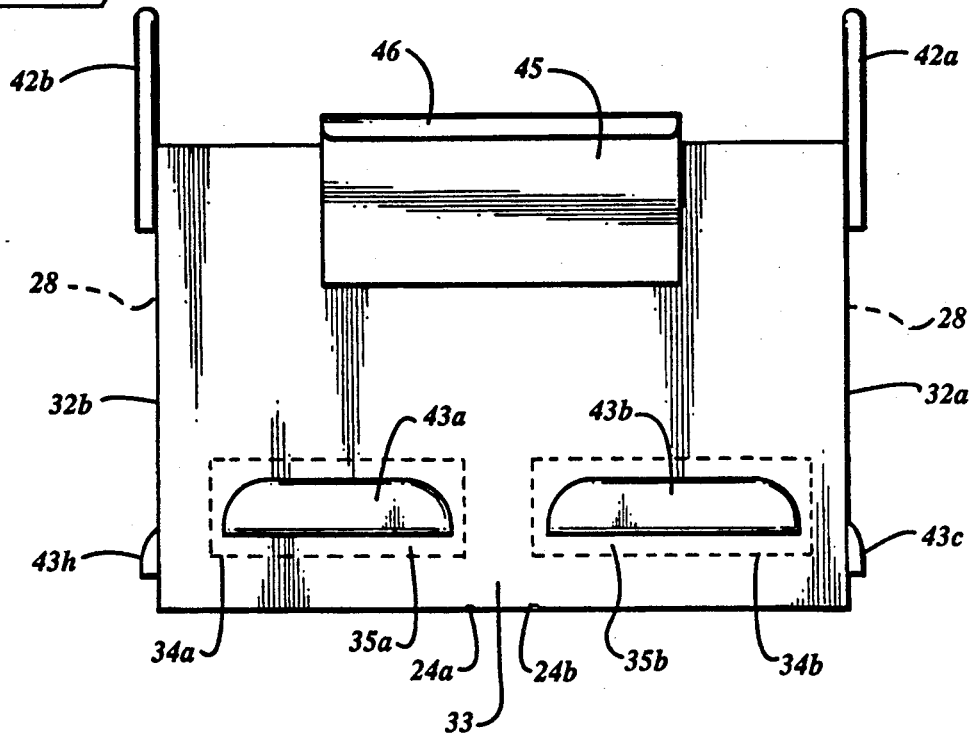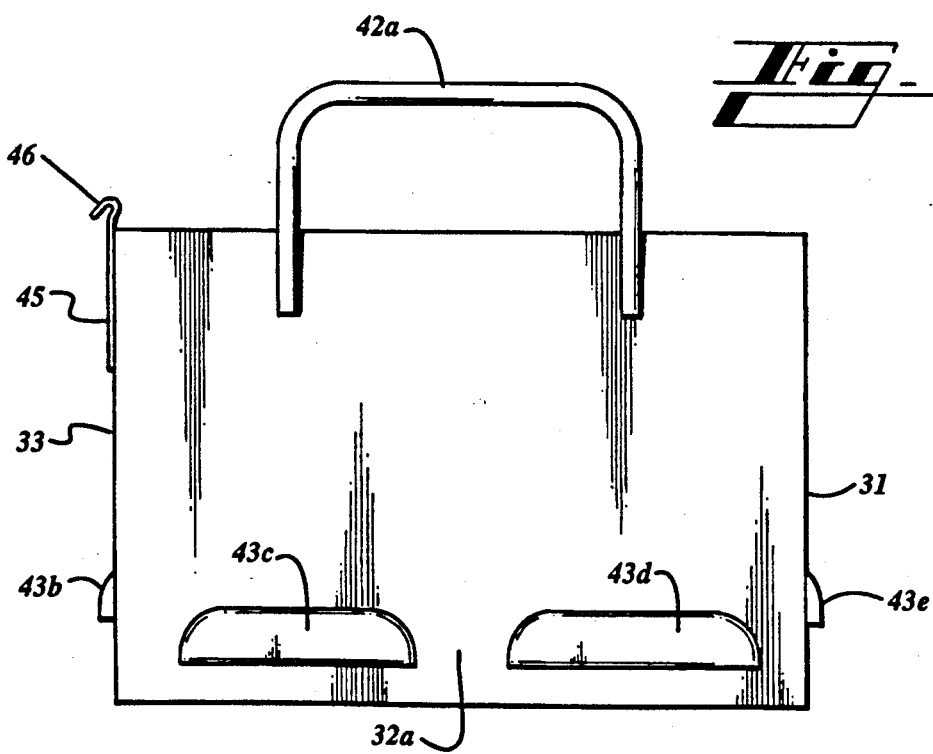

APPARATUS AND METHOD FOR PREPARING DEEP FRIED FOOD PORTIONS

TECHNICAL FIELD

This invention relates generally to food preparation and particularly to an apparatus and method for preparing deep fried food portions. The apparatus and method are especially suitable for preparing batter-coated food portions with minimal loss of batter caused by adhesion of the batter to the apparatus. The apparatus and method are also suitable for preventing the escape of particles, which naturally detach from the food portions during cooking, into the main supply of liquid in which the food portions are prepared.

BACKGROUND OF THE INVENTION

In the fast food industry, the preparation of deep fried food portions may be accomplished by placing an open mesh food basket in a conventional deep fryer, such as the Dean/ALCO Model 1414GTS Gas Fryer, manufactured by Dean Industries, Culver City, Calif. A typical food basket used in the industry is illustrated in U.S. Pat. No. 3,430,553, to DiPietro, at FIG. 4, reference no. 25, and U.S. Pat. No. 3,975,997, to DiPietro, at FIG. 4, reference no. 13 (both of these patents are herein incorporated by reference). Such conventional deep fryers contain a quantity of liquid, such as cooking oil, shortening, or water, which is heated to a required cooking temperature. The mesh design of typical food baskets permits easy entry of the heated liquid into the volume of the basket. For items such as french fried potatoes, the open mesh basket provides a sufficient means for preparation.

However, a currently popular type of deep fried food portions contains a coating of batter or breading which, as shown below, is not particularly suited for use with conventional mesh baskets. Small portions of a variety of food items, including but not limited to chicken, fish, shrimp, beef, and pork, may be dipped in a moist batter and deep fried, thus providing a cooked batter coating about the food. A conventional batter may consist primarily of flour, starch, baking powder, and sufficient quantities of water to obtain the thickness desired. When these batter-coated or breaded portions of food come into contact with the grids of the typical open mesh food basket, such as those illustrated in U.S. Pat. Nos. 3,430,553 and 3,975,997, the batter may conform to the grids and adhere or "grip" thereto. Upon removal of the cooked portions of batter-coated food from the food basket, those sections of batter which "gripped" the grids of the basket remain stuck thereto, thus leaving part of the cooked portion of food exposed and bearing an undesirable appearance to consumers. For those food portions coated with breading, the ingredients comprising the breading, namely wheat starch, corn starch, sugar, salt, and leavening, may not be adequately contained within the typical open mesh food baskets. Consequently, the ingredients eventually settle to the bottom of the conventional fryer, and if they are not promptly removed, they facilitate the breakdown and colorization of the cooking liquid.

Currently, one manner in which deep fried, batter-coated food portions may be prepared for restaurants is in a multi-step, multi-location procedure. Initially, the food portions are deep fried at a central location, where they are then frozen. After the portions are transported to a specific restaurant, they remain frozen until preparation is required. The portions of food are then refried in the conventional deep fryer discussed above, and they are served to consumers. This process, if not properly followed, can result in the oil or shortening retained in the frozen food turning rancid. Additionally, the effect of double frying the food portions is to alter their natural tastes.

A natural effect of the preparation of deep fried food portions in the methods discussed above is the detachment of small particles from the food portions during cooking. Devices such as those disclosed in U.S. Pat. Nos. 3,430,443, 3,975,997, 2,635,527, to Overbeck, and 3,993,645, to Keramidas (also incorporated herein by reference), describe systems for keeping such particles from escaping into the main supply of heated liquid in which the food basket is immersed. However, none of the above-cited prior art references discloses a food basket which, in and of itself, accomplishes this goal.

SUMMARY OF THE INVENTION

The present invention overcomes these and other difficulties encountered in prior art approaches to preparing deep fried food portions. Briefly described, the present invention comprises an apparatus and method for preparing deep fried food portions in a manner such that the food portions will not adhere to the apparatus and the apparatus will serve to prevent the escape of naturally detached particles from the food.

More particularly described, the preferred embodiment of the present invention comprises an open topped container which includes a floor and four side walls extending upwardly from the floor. The floor includes at least one floor portion which defines a smooth surface, at least one drain for facilitating the entry and exit of heated liquid into and out of the container, and at least one pin-hole sized hole for further facilitating the entry and exit of heated liquid into and out of the container. The container is mounted, via a bracket, to a conventional deep fryer, which is filled with a liquid used for preparation of the food portions. The container is immersed in the liquid and is filled at least partially, via the openings in the drain and pin-hole sized hole, with liquid.

When the conventional deep fryer heats the liquid to the required cooking temperature, portions of food are placed in the container. The initial action of these food portions is to sink to the bottom and directly contact the floor portion of the container. Because there are no openings (unlike the open mesh food basket), the portions of food are unable to conform to or "grip" the floor portion and, therefore, the food does not adhere to the container as in mesh baskets. Upon completion of preparation of the food, the container is lifted out of the liquid and replaced upon the bracket of the conventional deep fryer. Upon removal, the liquid within the volume of the container exits the container through the drain and pin-hole sized hole.

An interchangeable screen over the drain, the selected size of which is dependent upon the size of particles which naturally detach from the food during preparation, discourages the particles from escaping into the main supply of heated liquid during preparation. The container also includes two handles for easy lifting thereof, and the walls of the preferred embodiment of the present invention contain horizontal slit-like openings to further facilitate the flow of heated liquid into and out of the container.

Accordingly, it is an object of the present invention to provide an improved apparatus and method for preparing deep fried food portions.

It is another object of the present invention to provide an apparatus for preparing batter-coated food portions in a manner such that the batter does not adhere to the apparatus.

It is another object of the present invention to provide an improved apparatus and method for preparing deep fried food portions such that the food portions may be prepared fresh and fried only once.

It is another object of the present invention to provide an improved apparatus and method for preventing the flow of particles, which naturally detach from food during preparation in a deep fryer, into the main supply of heated liquid in which the food portions are prepared, such that the particles may be removed from the container immediately after food preparation and, consequently, the main supply of liquid is not unnecessarily deteriorated.

It is another object of the present invention to provide a method for preparing food portions in heated liquid, such that the container in which the food portions are prepared need only be cleaned on a daily, rather than on a per batch, basis.

These and other objects, features, and advantages of the present invention may be more clearly understood and appreciated from a review of the following detailed description of the preferred embodiment and by reference to the appended drawings and claims.

BRIEF DESCRIPTION OF THE DRAWINGS

FIG. 1 is a perspective pictorial view of the preferred embodiment of an apparatus for preparing deep fried food portions constructed in accordance with the present invention.

FIG. 2 is a top view of the preferred embodiment of an apparatus for preparing deep fried food portions constructed in accordance with the present invention.

FIG. 3 is a rear view of the preferred embodiment of an apparatus for preparing deep fried food portions in accordance with the present invention.

FIG. 4 is a side view of the preferred embodiment of an apparatus for preparing deep fried food portions constructed in accordance with the present invention.

DETAILED DESCRIPTION OF THE PREFERRED EMBODIMENT

Referring now to the drawings, in which like numerals indicate like elements throughout the several views, FIG. 1 shows that the preferred embodiment of the deep frying apparatus 10 constructed in accordance with the present invention comprises a floor 20, a front wall 31, left and right walls 32A and 32B, and a rear wall 33. It should be understood that terms such as "front", "rear", "left", and "right" are relative terms, being selected relative to the typical standing position of an operator, who would view the front wall to be immediately in front of him, and the left and right walls to his left and right as he views and handles the apparatus 10.

The floor 20 includes at least one drain 21, which is covered by an interchangeable mesh screen 22. The selected size of the holes 23 in the mesh screen 22 is dependent upon the size of particles which naturally detach from selected food portions 26 during preparation. The screen 22 discourages the escape of particles into the main supply of heated liquid (not pictured) during preparation. Two pin-hole sized drainage holes 24A and B, best seen in FIG. 3, are located along the rear edge of the floor 20. These drainage holes 24A and 24B facilitate the entry and complete drainage of heated liquid into and out of the container during food preparation. The remainder of the floor 20 is a smooth surface capable of supporting food portions 26 during preparation.

Two handles 42A and 42B are mounted to the outside of the left and right walls 32A and 32B, respectively. A mounting bracket 45 having a downturned lip 46 is affixed to the outside of the rear wall 33. This mounting bracket 45 is used to position the apparatus 10 within a conventional deep fryer (not pictured) during preparation of food by positioning the lip 46 over the upper edge of a typical side wall of the deep fryer. Each of the four walls 31, 32A, 32B, and 33 contain two horizontal drainage slits 34A, 34B, 34C, 34D, 34E, 34F, 34G, and 34H. These drainage slits also facilitate the entry and exit of heated liquid into and out of the apparatus 10 during preparation of the food portions 26. Each of the drainage slits 34A, 34B, 34C, 34D, 34E, 34F, 34G, and 34H (some of which are best illustrated in other figures) is covered by a drainage slit screen 35A, 35B, 35C, 35D, 35E, 35F, 35G, and 35H (some of which are best illustrated in other figures), which serves, as with the mesh screen 22, to prevent the escape of particles into the main supply of heated liquid. Splatter hoods 43A, 43B, 43C, 43D, 43E, 43F, 43G, and 43H (some of which are best illustrated in other figures) are affixed to the outside of the walls directly over the drainage slits. Upon slowly lifting of the apparatus 10 from the conventional deep fryer, the splatter hoods force the heated liquid to exit the apparatus 10 in a downward direction, thus preventing the exiting heated liquid from splashing upon the individual using the apparatus. The height of the drainage slits in the front and rear walls 31 and 33 is the same, but this height is different than the height of the drainage slits in the left and right walls 32A and 32B. These differing heights permit quantities of heated liquid to enter the apparatus 10 at two separate levels, thus ensuring that the temperature of liquid at a particular level within the apparatus will approximate the temperature of the liquid at a particular level outside the apparatus as closely as possible.

Still referring to FIG. 1, the apparatus 10 includes a substantially planar floor 20. It should be understood that such a floor 20 includes a plurality of substantially planar floor portions capable of supporting food portions coated with conventional batter or breading, now referred to as coated food portions 26, such as shown in phantom. It should also be understood that the food portions 26 will preferably contact the floor during the initial portion of the cooking process in which the apparatus 10 is partially submerged in cooking liquid and the food portions 26 are completely submerged in cooking liquid.

Referring now to FIG. 2, it may be seen that when portions of batter-coated food contact the smooth surface of the floor 20, there is no possibility that such food portions 26 will "grip" the substantially planar surface. The drain 21 and drainage holes 24A and 24B facilitate the entry and complete drainage of heated liquid into and out of the apparatus 10. Because the configuration of the apparatus 10 discourages adhesion of batter to the surface of the floor 20, the apparatus need not be cleaned as often as prior art baskets, such as each time a new batch of food portions 26 is prepared. The apparatus 10 need only be cleaned on a daily basis, or, if necessary, upon complete saturation of the screen 22 with particles.

FIG. 3 provides a view of the relationship between the splatter hoods 43A, 43B, 43C, 43D, 43E, 43F, 43G, and 43H and the drainage slit screens 35A, 35B, 35C, 35D, 35E, 35F, 35G, and 35H. The splatter hoods are mounted on the outside of each wall directly over the drainage slits 34A, 34B, 34C, 34D, 34E, 34F, 34G, and 34H, which are covered on the inside by the drainage slit screens. FIG. 3 also provides a perspective of the different heights of the drainage slits. The drainage slits in the front and rear walls 31 and 33, are higher than the drainage slits in the right and left walls 32A and 32B.

Although the preferred embodiment of the present invention, as shown in FIG. 1, illustrates drainage slit screens 35A, 35B, 35C, 35D, 35E, 35F, 35G, and 35H which have been welded to the apparatus 10, it should be understood that the invention also contemplates the use of removable slit screens instead of slit screens welded in place. Such removable configuration could be provided by use of a slide-in/slide-out drainage slit screen configured to fit within corresponding slots defined by the apparatus. Therefore, it should be understood that an operator could manually interchange drainage slit screens having different mesh sizes, depending upon the size of particles desired to be filtered.

FIG. 4 shows the shape of the mounting bracket 45 and lip 46, which is mounted on the upper edge of a side wall of the conventional deep fryer in which the apparatus 10 is placed during preparation of the food portions 26.

The method of operation of the apparatus 10 is now discussed. Food such as chicken, fish, shrimp, beef, or pork is cut or otherwise processed into desirably sized food portions 26. A coating mixture such as the previously described batter or bread mixtures is likewise prepared in desired quantities. The food portions 26 are refrigerated until preparation. When consumer demand requires preparation of the food portions 26, the operator removes the food portions 26 from the refrigerator and dips them into the coating mixture. Next, the operator manually places the food portions 26 into the apparatus 10. The apparatus 10 has previously been placed in a conventional deep fryer filled with a heated cooking liquid, and a volume of the cooking liquid has entered the apparatus 10 through the drainage slits 34A, 34B, 34C, 34D, 34E, 34F, 34G, and 34H, drain 21, and drainage holes 24A and 24B. The apparatus 10 is preferably positioned within the deep fryer so as to be partially submerged to at least the liquid level line 28. It may be understood that complete submergence of the drainage slits 34A, 34B, 34C, 34D, 34E, 34F, 34G, and 34H and the drainage slit screens 35A, 35B, 35C, 35D, 35E, 35F, 35G, and 35H prevents the escape of particles, floating at the liquid level line 28, through such openings and into the main supply of cooking liquid. Upon placement of the food portions 26 in the liquid-filled apparatus 10, the food portions 26 immediately sink to the bottom of the apparatus 10, directly contacting the floor 20. Soon thereafter, the food portions 26 float toward the surface of the cooking liquid, indicating to the individual preparing them that the layer of batter or breading around the food portions 26 has partially solidified and that preferably two to three minutes remain before the food portions 26 are completely cooked. Upon complete cooking of all the food portions 26 within the container, the operator removes the food portions 26 from the container with a large mesh spoon, thus draining any excess cooking liquid off of the food portions 26. The food portions 26 are then ready for service to consumers. Before the addition of a new batch of batter-coated or breaded food portions 26 to the liquid-filled container, a spoon with a smaller mesh than the spoon used to remove the food portions is used to remove any particles of food which may have accumulated in the cooking liquid. The food preparation process is then repeated. At the end of the day, the apparatus 10 is removed from the deep fryer and the lip 46 of the bracket 45 is placed upon a side wall of the deep fryer, with the apparatus out of the cooking liquid, so as to allow drainage of all cooking liquid from the apparatus 10. The apparatus 10 is then cleaned and ready to be used the following day.

It will by now be appreciated that there has been described an apparatus and method for preparing deep fried food portions 26. It will also be appreciated that the deep fried food will not adhere to or "grip" the floor 20 of the apparatus.

Accordingly, it will be understood that the preferred embodiment of the present invention has been disclosed by way of example and that other modifications and alterations may occur to those skilled in the art without departing from the scope and sphere of the appended claims.

What is claimed is:

1. An apparatus for preparing food portions immersed in heated liquid comprising:
   an open-topped container configured to be immersed in said heated liquid and to be filled at least partially with said heated liquid and to discourage the escape of food particles which detach from said food portions during preparation into said heated liquid in which said container is immersed, said container comprising:
   a) a floor including the following:
      at least one floor portion defining a smooth surface capable of supporting said food portions;
      at least one drain for facilitating the entry and exit of said heated liquid into and out of said container;
      at least one pinhole-sized hole for further facilitating the entry and exit of said liquid into and out of said container;
   b) at least one wall extending upwardly from said floor, said wall defining a drainage slit extending therethrough and having an inside surface and an outside surface; and
   c) a splatter hood attached to and extending from said outside surface of said wall, said drain hood extending downwardly from above said drain slit such that liquid passing out of said container through said drain slit tends to be directed downwardly.

2. The apparatus of claim 1, whereby said drain is covered with a screen which prevents the escape of said particles, during preparation, into said heated liquid in which said container is immersed.

3. The apparatus of claim 2, whereby the size of the openings in said screen is dependent upon the size of said particles such that said openings are sufficiently smaller than said particles so as to prevent said particles from escaping into said heated liquid in which said container is immersed.

4. A method for preparing food portions in heated liquid, comprising the steps of:

immersing an open-topped container into said heated liquid, said container including at least one floor portion defining a smooth surface capable of supporting said food portions, including at least one side wall defining a drainage slit for facilitating the entry and exit of said heated liquid into and out of said container, including a splatter hood attached to and extending downwardly from said outside surface of said side wall and at least one pinhole-sized hole for further facilitating the entry and exit of said heated liquid into and out of said container in a quantity of heated liquid such that the volume of said container is at least partially filled with said heated liquid;

placing food portions into said container such that said food portions directly contact said surface of said floor portion; and withdrawing said open-topped container from said heated liquid such that said cover hood directs liquid escaping through said drainage slit in a downward direction.

5. An apparatus for preparing deep fried food portions, comprising:

a floor including a plurality of smooth-surface floor portions, at least one drain, and at least one pinhole-sized drainage hole;

four walls extending upwardly from said floor such that said walls and said floor are an open-topped container;

two handles affixed to the outside of two of said walls such that said handles are directly opposite each other;

one mounting bracket affixed to the outside of one of said walls upon which said handles are not mounted such that said container may be supported during food preparation;

at least two horizontal drainage slits in each of said walls;

mesh screens affixed to the inside of each wall directly covering each of said drainage slits;

a mesh screen covering said drain; and splatter hoods mounted upon the outside of each of said walls directly over said drainage slits and extending downwardly over said drainage slits.

6. A method for preparing deep fried food portions in an open-topped container having a substantially planar floor portion, at least one side wall defining at least one drainage slit for facilitating liquid flow into said container, and at least one splatter hood mounted on the outside of at least one of said walls and extending downwardly over said drainage slit, said method comprising the steps of:

a) at least partially immersing an open-topped container into heated liquid such that said at least a portion of said liquid flows into said open-topped container through said drainage slit until said floor portion is completely immersed in said heated liquid and a portion of said liquid is within said container; and b) dropping a food portion into said liquid portion such that said food portion is completely immersed in said liquid portion and is supported by said floor portion;

c) withdrawing said food portion from said container and heated liquid; and d) withdrawing said open-topped container from said heated liquid such that at least a portion of said liquid exits through said drainage slit and is directed downwardly by said splatter hood.

7. The method as claimed in claim 6, wherein said food portion in step "b" is a piece of food selected from the group consisting of chicken, fish, shrimp, beef, and pork, and is then dipped in a moist batter prior to insertion into said heated liquid.

8. The method as claimed in claim 7, wherein said food portion in step "b" is a piece of food selected from the group consisting of chicken, fish, shrimp, beef, and pork, and is then dipped in a moist batter prior to insertion into said heated liquid.

9. The method as claimed in claim 6, further comprising step "c" in which said food portions are removed from said open-topped container while said floor portion remains immersed in said liquid.

10. A method for preparing deep fried food portions in an open-topped container having a substantially planar floor portion, at least one side wall defining at least one drain hole for facilitating liquid flow into said container, comprising the steps of:

a) at least partially immersing an open-topped container into heated liquid such that said liquid flows into said open-topped container through said drain hole until said floor portion is completely immersed in said heated liquid and a portion of said liquid is within said container;

b) dropping a food portion into said liquid portion; and c) removing said food portion from said open-topped container while said floor portion remains immersed in said liquid; and d) withdrawing said open-topped container from said heated liquid such that at least a portion of said liquid exits through said drainage slit and is directed downwardly by said splatter hood.

11. The method as claimed in claim 10, wherein said food portion in step "b" is a piece of food selected from the group consisting of chicken, fish, shrimp, beef, and pork, and is then dipped in a moist batter prior to insertion into said heated liquid.

12. An apparatus for immersion in heated liquid, said apparatus comprising:

at least one floor portion defining a smooth surface;

at least one side wall having an interior and an exterior surface, said side wall defining a drain hole extending therethrough;

a splatter hood positioned above said drain hole of said side wall, said drain hood extending from the exterior surface of said side wall and extending downwardly over said drain hole, such that heated liquid passing from within said apparatus to outside of said apparatus through said drain hole tends to be directed downwardly by said splatter hood.

13. The apparatus as claimed in claim 12, further comprising a screen positioned within said drain hole.

* * * * *